(12) United States Patent
Shinya

(10) Patent No.: US 7,002,693 B2
(45) Date of Patent: Feb. 21, 2006

(54) THICKNESS MEASUREMENT METHOD AND APPARATUS

(75) Inventor: Kazunari Shinya, Osaka-fu (JP)

(73) Assignee: Shimadzu Corporation, Kyoto (JP)

( * ) Notice: Subject to any disclaimer, the term of this patent is extended or adjusted under 35 U.S.C. 154(b) by 322 days.

(21) Appl. No.: 10/440,198

(22) Filed: May 19, 2003

(65) Prior Publication Data

US 2003/0218758 A1     Nov. 27, 2003

(30) Foreign Application Priority Data

May 22, 2002   (JP)   ............................. 2002-147107

(51) Int. Cl.
*G01B 9/02*         (2006.01)
(52) U.S. Cl. ...................................... 356/504
(58) Field of Classification Search .................. 356/503, 356/504, 497
See application file for complete search history.

(56) References Cited

U.S. PATENT DOCUMENTS

| | | | | | |
|---|---|---|---|---|---|
| 5,293,214 A | * | 3/1994 | Ledger | ........................ | 356/504 |
| 6,753,972 B1 | * | 6/2004 | Hirose et al. | ................ | 356/630 |

\* cited by examiner

*Primary Examiner*—Hwa (Andrew) Lee
(74) *Attorney, Agent, or Firm*—Westerman, Hattori, Daniels & Adrian, LLP

(57) ABSTRACT

A monochromatic light is cast on a thin layer, and the intensity of the reflected light which is an interference light of the lights reflected by the front surface and back surface of the layer. A spectrum (a measured spectrum) is obtained from the measured intensity by scanning the wavenumber of the monochromatic light. On the other hand, a constructed spectrum is created based on an assumed thickness using a predetermined function. Then an error between the measured spectrum and the constructed spectrum is calculated. The value of the error is plotted against the assumed thickness, and the point at which the error is minimum is detected. The assumed thickness at the error-minimum point is determined as the thickness of the layer.

10 Claims, 4 Drawing Sheets

THICKNESS MEASUREMENT METHOD AND APPARATUS

The present invention relates to a method and apparatus of measuring the thickness of a thin film or a thin layer on a substrate using the spectroscopic measurement. The method and apparatus can be used in various fields including, for example, measurement of the thickness of various layers on a wafer substrate in the semiconductor industry.

BACKGROUND OF THE INVENTION

An application of a spectrophotometer using the visible light or infrared light is the measurement of the thickness of a thin film or a thin layer on a substrate. The principle of the spectroscopic thickness measurement is as follows.

When a ray of measurement light having a single wavelength is cast on a thin layer S, as shown in FIG. 11, a part of the light is reflected on the surface (front surface) S1, and the rest enters the layer S. A part of the incoming light is also reflected by the other surface (back surface or boundary with a substrate) S2, go back through the layer S, and go out through the front surface S1. Since the first reflected light and the second reflected light have different path lengths, an interference occurs between them depending on the wavelength of the measurement light and the thickness of the layer S. When a graph is drawn with the wavelength (or wavenumber) of the measurement light as the abscissa and the intensity of the interference light as the ordinate while the wavelength of the measurement light is changed (or scanned), a wavy interference spectrum is obtained. The waveform of the interference spectrum can be represented by a cosine function, and the cycle interval of the cosine function corresponds to the thickness of the layer.

The wavenumber at every crest (peak-top) or trough (valley-bottom) of the interference spectrum is measured automatically or manually, and the cycle interval in the wavenumbers between the crests or between troughs is determined using, for example, the least square error method. Then the thickness is determined using the wavenumber cycle interval and a known refractive index n.

The shape of interference spectrums obtained through spectroscopies is rarely ideal due to various factors. The factors include the wavenumber dependency of the interference efficiency, the wavenumber dependency of the energy distribution of the light source, and various noises arising from the apparatus. In conventional methods, these factors were not taken into account, and it was assumed that the waveform of the interference spectrum is an ideal cosine curve. Thus it was difficult to improve the accuracy of the thickness measurement.

Another problem in conventional methods is that a unique thickness was supposed for a layer. When, however, one desires to apply the method to a chemical mechanical polisher (CMP), it is necessary to measure different thicknesses of a layer deliberately formed to have several different thicknesses. The chemical mechanical polishing operation should be finished using the measured thicknesses. It was difficult by conventional methods to measure such a plurality of thicknesses.

SUMMARY OF THE INVENTION

The present invention addresses the problems, and an object of the present invention is, therefore, to provide a method of and an apparatus for measuring the thickness of a layer with higher accuracy than conventional methods.

Another object of the present invention is to provide a method of and an apparatus for measuring the thicknesses of a layer having several different thicknesses within a measurement area.

According to the present invention, a method of measuring a thickness of a layer includes the following steps:

casting a monochromatic light on the layer;

measuring the intensity of the interference light of the lights reflected by the front surface and back surface of the layer;

obtaining a measured spectrum by plotting the intensity of the interference light against the wavenumber of the monochromatic light;

creating a constructed spectrum based on an assumed thickness using a predetermined function;

calculating an error between the measured spectrum and the constructed spectrum; and detecting the value of the assumed thickness at which the error is minimum while changing the assumed thickness, whereby the value is determined as the thickness of the layer.

If, in the thickness determining step, plural minimums (local minimums) appear in the error-thickness graph, the plural minimums determine plural thicknesses of the layer.

An apparatus for measuring a thickness of a layer according to the present invention includes:

means for casting a monochromatic light on the layer;

a photodetector for measuring the intensity of the interference light of the lights reflected by the front surface and back surface of the layer;

means for creating a measured spectrum by plotting the intensity of the interference light while changing the wavenumber of the monochromatic light;

means for creating a constructed spectrum based on an assumed thickness using a predetermined function;

means for calculating an error between the measured spectrum and the constructed spectrum; and means for detecting the value of the assumed thickness at which the error is minimum while changing the assumed thickness, whereby the value is determined as the thickness of the layer.

In the thickness measurement method or apparatus, the constructed spectrum may be made by a liner sum of a plurality of base spectrums, where the base spectrums are functions of the assumed thickness or thicknesses.

When the thicknesses of a layer having plural thicknesses are intended to be measured at high accuracy, the constructed spectrum is created using a plurality of assumed thicknesses. The error between the measured spectrum and the constructed spectrum is calculated for every combination of the plurality of assumed thicknesses, and the thicknesses of the layer are determined as the combination of the assumed thicknesses at which the error is the minimum.

The principle of the thickness measurement according to the first method of the present invention is described.

[First Method]

An example of an interference spectrum obtained through a measurement of a layer is shown in FIG. 3. The waveform of the interference spectrum teaches the following facts.

(i) There exists an interference pattern of a certain regular cycle.

(ii) There is an offset.

(iii) There is an almost linear increasing drift.

(iv) Because of the interference efficiency, the amplitude of the interference wave is smaller as the wavenumber is larger.

Taking these facts into consideration, the waveform of the interference spectrum can be approximated by the following formula (1) if the cycle ω of the interference wave is known.

$$f(x) = \alpha_0 + \alpha_1 x + \alpha_2 (1/x) \sin(\omega x + \delta) \quad (1)$$

In the above formula (1), the first term in the right side represents the offset, the second term the drift, and the third term the cyclic wave form. More precisely, the (1/x) of the third term shows the decrease in the amplitude according to the increase in the wavenumber, and δ means the shift in the phase which becomes conspicuous as the thickness becomes very large.

Since $$\sin(\omega x + \delta) = \sin \omega x \cos \delta + \cos \omega x \sin \delta,$$

equation (1) can be rewritten as $$f(x) = \alpha_0 + \alpha_1 x + \alpha_2 (1/x) \sin \omega x + \alpha_3 (1/x) \cos \omega x \quad (2).$$

Using functions $f_0(x)$, $f_1(x)$, $f_2(x)$, $f_3(x)$ defined by $$f_0(x) = 1,$$

$$f_1(x) = x,$$

$$f_2(x) = (1/x) \sin \omega x, \text{ and}$$

$$f_3(x) = (1/x) \cos \omega x,$$

the measured spectrum g(x) obtained through a measurement can be approximated by the linear sum f(x) of the four functions $f_0(x)$, $f_1(x)$, $f_2(x)$ and $f_3(x)$.

$$f(x) = \alpha_0 f_0(x) + \alpha_1 f_1(x) + \alpha_2 f_2(x) + \alpha_3 f_3(x) \quad (3)$$

In the above explanation, the cycle ω is supposed to be known. But, practically, ω is unknown (or cannot be determined precisely). The assumption that the constructed spectrum f(x) is optimally approximated to the measured spectrum g(x) means that the square sum of the differences (or errors) between the two functions is the least. While changing the value of the cycle ω, the square sum of the errors of the constructed function f(x) from the measured spectrum function g(x) is calculated. The value of the cycle ωs when the square sum of the errors is least is most probable to be the objective cycle.

The relationship between the thickness of a layer and the cycle of the interference waveform is discussed. When, as is already known, a ray of measurement light enters a layer of refractive index n at an incident angle θ, as shown in FIG. 11, the basic equation for calculating the thickness d of the layer is $$d[\text{cm}] = \Delta m / \{2 \cdot (n^2 - \sin^2 \theta)^{1/2} (1/\lambda_2 - 1/\lambda_1)\} \quad (4)$$

where Δm is the order number of the peak of wavelength $\lambda_2$ when counted from the peak of wavelength $\lambda_1$ toward shorter wavelengths. Normally, Δm=1.

Using the cycle $T[\text{cm}^{-1}] = 1/\lambda_2 - 1/\lambda_1$, equation (4) can be rewritten as $$d = \tfrac{1}{2} \cdot (n^2 - \sin^2 \theta)^{1/2} T,$$

and it is further rewritten as $$T = 1/\{2 \cdot (n^2 - \sin^2 \theta)^{1/2} d\} = 1 \times 10^7 / \{2 \cdot (n^2 - \sin^2 \theta)^{1/2} d'\},$$

where d is represented in cm, and d' in nm.

If it is supposed that θ=0, the terms including sin θ can be neglected, and the following equation is obtained.

$$T = 1 \times 10^7 / (2 \cdot n \cdot d') \quad (5)$$

When, for example, the refractive index n is 1.466 and the layer thickness is 300 nm, the cycle T is calculated as follows.

$$T = 1 \times 10^7 / (2 \times 1.466 \times 300) = 11368 \text{ cm}^{-1}.$$

As shown in equation (5), the cycle T is a function of the thickness d'. As mentioned above, use of an unknown value ω as the parameter can be replaced by use of an unknown thickness as the parameter. If, on the other hand, the cycle is known, as explained above, the measured spectrum g(x) can be well approximated by the constructed spectrum f(x). Here, base spectrums are introduced to represent the constructed spectrum f(x), and the difference (or error) between the measured spectrum g(x) and the constructed spectrum f(x) is then calculated using the thickness d' as the parameter.

Measuring points of the measured spectrum g(x) and the constructed spectrum f(x) are respectively represented as.

$$Y = \begin{pmatrix} y_0 \\ y_1 \\ \vdots \\ y_{N-1} \end{pmatrix} \quad X = \begin{pmatrix} x_0 \\ x_1 \\ \vdots \\ x_{N-1} \end{pmatrix}$$

Using X and Y, the error function ε(d') is defined as $$\varepsilon(d') = \sqrt{\frac{{}^t(Y - Y')(Y - Y')}{N - 1}} \quad (6)$$

$$Y' = A({}^t A A)^{-1\,t} A Y \quad (6\text{-}1)$$

$$A(d') = \begin{pmatrix} 1 & \frac{1}{x_0} \cos \frac{2\pi}{T(d')} x_0 & \frac{1}{x_0} \sin \frac{2\pi}{T(d')} x_0 & 0 \\ 1 & \frac{1}{x_1} \cos \frac{2\pi}{T(d')} x_1 & \frac{1}{x_1} \sin \frac{2\pi}{T(d')} x_1 & 1 \\ \vdots & \vdots & \vdots & 2 \\ \vdots & \vdots & \vdots & \vdots \\ 1 & \frac{1}{x_{N-1}} \cos \frac{2\pi}{T(d')} x_{N-1} & \frac{1}{x_{N-1}} \sin \frac{2\pi}{T(d')} x_{N-1} & N-1 \end{pmatrix} \quad (6\text{-}2)$$

In the equation (6-2), T(d') is the cycle T using d' as the variable in equation (5). When the thickness d' is determined, the base spectrums of equation (6-2) are determined, and the measuring points at which the square error is minimum can be determined. Thus, when a certain value is supposed as the thickness of the layer, the constructed spectrum developing the least square error with the measured spectrum (or the original waveform) can be determined, and the least square error for the thickness is obtained.

For every value of thickness taken at predetermined intervals within a predetermined range, the base spectrums are defined, and the least square error is calculated. By plotting the least square errors against the thicknesses, the graph shown in FIG. 4 is obtained. In the graph of FIG. 4, the minimum point appears at the thickness of 1750 nm. This shows that when the thickness is 1750 nm, the constructed spectrum f(x) is closest to the measurement spectrum g(x), which means that the thickness to be detected is 1750 nm.

The above thickness calculating method is verified as follows. According to equation (5), the cycle T at the thickness value of 1750 nm is 1950 cm$^{-1}$. The constructed spectrum at this value of cycle T is overlapped on the measurement spectrum as in FIG. 5. The measurement spectrum reveals peaks at the interval of about 2000 cm$^{-1}$, which is close to that of the constructed spectrum. The offset, drift and the manner of amplitude attenuation are also well simulated by the constructed spectrum. This shows that the thickness value calculated as above is fairy accurate.

In the above explanation, it is supposed that a layer has a unique thickness. When a layer has plural thicknesses, the peaks in the interference wave do not appear regularly. For example, the peaks appear irregularly as shown in FIG. 9. If, as shown in FIG. 6, a layer has two thicknesses $d_1$ and $d_2$, the relationship between the thickness and the least square error obtained through the above method is as shown in FIG. 7. This graph shows two local minimums. When the two local minimums are apparently separate, the two thicknesses $d_1$ and d2 can be respectively calculated.

When the two local minimums are very close as shown in FIG. 8, the valleys overlap and it is difficult to visually measure the two minimums exactly. In this case, the two minimums are separated by a predetermined peak separating operation well known in the art of chromatography (Gaussian or Lorentz Fittings).

[Second Method]

It is possible, as described above, to calculate the plural thicknesses of a layer using the above first method. However, the equations (3) and (6-2) are derived from the assumption that a layer has a unique thickness, so that high fidelity simulation is difficult for a layer having plural thicknesses. FIG. 9 shows the measured spectrum overlapped by the closest constructed spectrum obtained by the first method. The constructed spectrum hardly simulates the measured spectrum. When it is known that an object layer or film has plural thicknesses, the following second method is preferable to calculate the thicknesses with higher precision.

The basic principle of the second method is the same as the first method. It differs from the first method in two points: the measured spectrum g(x) is approximated by a linear sum of base spectrums which are made under the assumption of plural thicknesses, and the optimal constructed spectrum f(x) is searched to have the least square error from the measured spectrum g(x) assuming concrete values of the plural thicknesses beforehand.

Specifically, the second method is performed as follows. When a layer has two thicknesses $d_1$ and $d_2$, the interference spectrum waveform may approximated using cycles $\omega_1$ and $\omega_2$ respectively corresponding to the thicknesses $d_1$ and $d_2$ as follows.

$$f(x)=\alpha_0+\alpha_1 x+\alpha_2(1/x)\sin(\omega_1 x+\delta_1)+\alpha_3(1/x)\sin(\omega_2 x+\delta_2)$$

Similarly to the first method, the sin terms are decomposed as follows.

$$f(x)=\alpha_0+\alpha_1 x+\alpha_2(1/x)\sin \omega_1 x+\alpha_3(1/x)\cos \omega_1 x+\alpha_4(1/x)\sin \omega_2 x+\alpha_5(1/x)\cos \omega_2$$

Using six functions $f_0(x)$, $f_1(x)$, $f_2(x)$, $f_3(x)$, $f_4(x)$, $f_5(x)$ defined by $$f_0(x)=1,$$

$$f_1(x)=x,$$

$$f_2(x)=(1/x)\sin \omega_1 x,$$

$$f_3(x)=(1/x)\sin \omega_1 x,$$

$$f_4(x)=(1/x)\sin \omega_2 x \text{ and}$$

$$f_5(x)=(1/x)\cos \omega_2 x,$$

the measured spectrum g(x) may be approximated by the linear sum f(x) of the six base functions.

$$f(x)=\alpha_0 f_0(x)+\alpha_1 f_1(x)+\alpha_2 f_2(x)+\alpha_3 f_3(x)+\alpha_4 f_4(x)+\alpha_5 f_5(x) \quad (7)$$

In this case also it is possible to use the linear sum of the base spectrums as equations (6), (6-1) and (6-2). In those equations, however, the thickness is a single variable, but the two thicknesses $d_1$ and $d_2$ are variables in the above equation (7). When, therefore, the square error between the measured spectrum and the constructed spectrum is calculated, the two thicknesses $d_1$ and $d_2$ should be specifically supposed. It is necessary for that to search the least square error by calculating the square errors successively while one of the variables, for example $d_2$, is changed with the other variable $d_1$ fixed.

After the calculations, the least square error is determined for a combination of certain values ($d_1$, $d_2$) of the two variables. In this case, the relationship among the three values (error, $d_1$ and $d_2$) cannot be represented by a two-dimensional graph as in the first method; it is represented by a three-dimensional graph with the two thicknesses and the square error assigned to the three axes. FIG. 10 shows another expression of the relationship, where the axes of thicknesses $d_1$ and $d_2$ lie in the sheet plane and the axis of square error stands perpendicular to the sheet plane. The square errors form a surface in the three-dimensional space. Using the graph, the combination ($d_1$, $d_2$) of the thicknesses at which the square error is least except the point of $d_1=d_2$ is searched, and the values $d_1$ and $d_2$ at the least square error are determined as the thicknesses of the layer.

It is of course possible to extend the above method to the case of three thicknesses or more. If the number of thicknesses of a layer is unknown, the number is detected by the first method, and then the second method is employed using the known number of thicknesses. This method assures higher accuracy in the thickness measurement.

BRIEF DESCRIPTION OF THE ATTACHED DRAWINGS

DETAILED DESCRIPTION OF PREFERRED EMBODIMENTS

Figure 1:
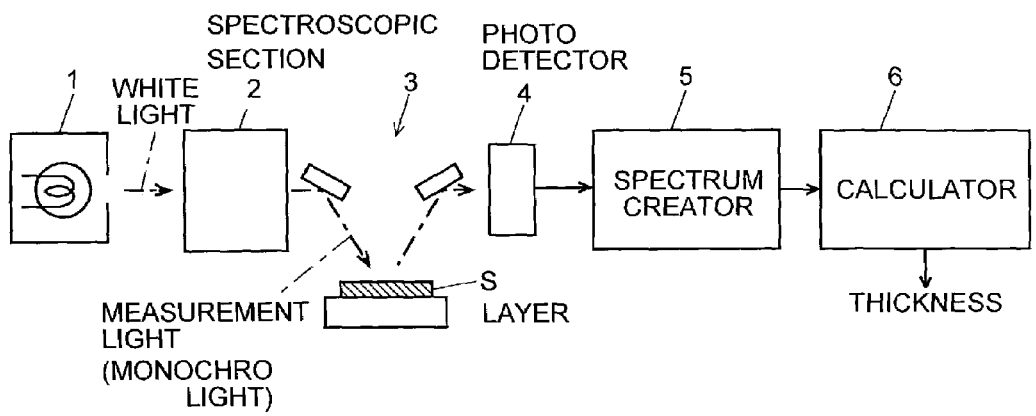
FIG. 1 is a block diagram illustrating the construction of the thickness meter of an embodiment.

A thickness meter embodying the method of the present invention is described. FIG. 1 is a block diagram illustrating the construction of the thickness meter of the present embodiment. The thickness meter includes a light source 1, a spectroscopic section 2, an optical system 3, a photodetector 4, a spectrum creating section 5 and a calculating section 6, where an interference spectrum created in the spectrum creating section 5 is sent to the calculating section 6 and a thickness is calculated based on the interference spectrum according to the method described later. The spectrum creating section 5 and the calculating section 6 are actually constructed by appropriate programs run on a personal computer.

The basic operation of the thickness meter is as follows. From the white light emitted from the light source 1, a monochromatic light having a single wavelength is extracted in the spectroscopic section 2. The monochromatic light is cast on a thin layer S through the optical system 3. Light reflected on the front surface and back surface of the layer S is introduced to the photodetector 4 again through the optical system 3, and electrical signal corresponding to the intensity of the reflected lights is sent from the photodetector 4 to the spectrum creating section 5. The reflected light is, as described later, an interference light of the two reflected lights. The wavelength (or wavenumber) of the monochromatic light generated in the spectroscopic section 2 is changed (or scanned) within a predetermined range according to the control from the spectrum creating section 5. Based on the intensity signal from the photodetector 4, the spectrum creating section 5 creates the interference spectrum with the wavenumber (or wavelength) as the abscissa and the intensity as the ordinate. The interference spectrum thus created is the measurement spectrum described above.

The calculating section 6 receives the interference spectrum, and executes calculations according to the first method or second method described before to obtain the thickness of the layer S. Though, in the following explanation, the calculations according to the first method is described, it is obvious for a person having ordinary skill in the art to apply the calculations to the second method.

Figure 2:
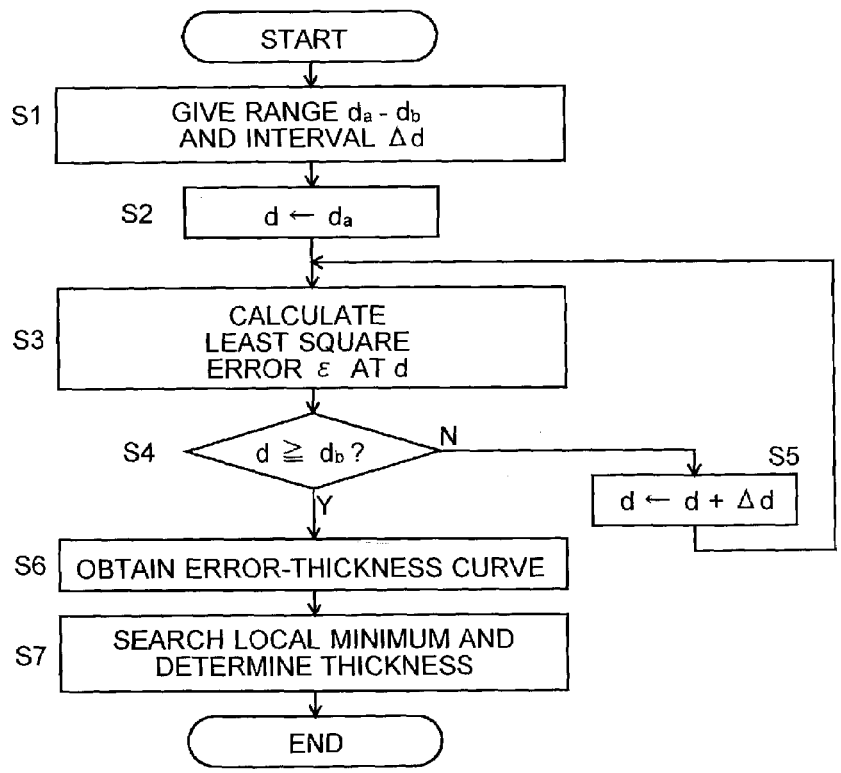
FIG. 2 is a flowchart of calculations for determining a thickness of a layer.
Figure 3:
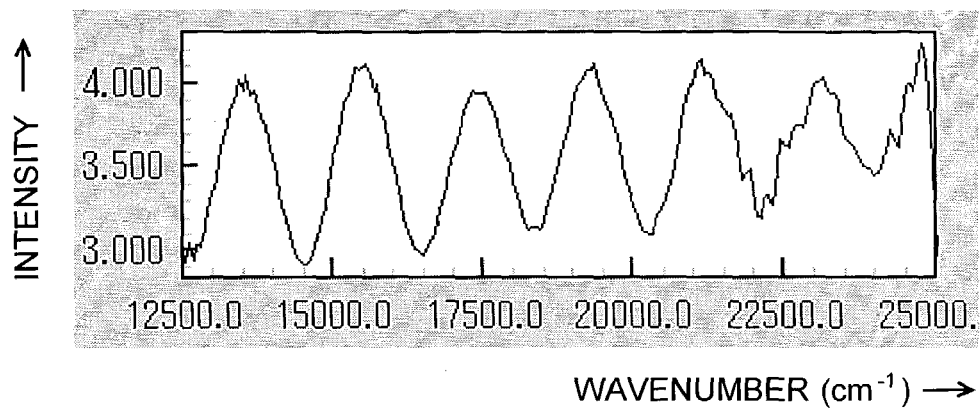
FIG. 3 is an example of an interference spectrum obtained through a measurement of a layer.

FIG. 2 is a flowchart of the calculations. First, a range of thickness $d_a$–$d_b$, and a step interval $\Delta d$ is given to the calculating section 6 (step S1). If the largest value and the smallest value of the thickness are roughly known, it is better to set the thickness range $d_a$–$d_b$ to avoid unnecessary calculations and save the calculation time. For higher accuracy, the step interval $\Delta d$ is preferred to be smaller, but for shorter calculation time, it is preferred to be larger. The value of step interval $\Delta d$ is determined regarding the opposing factors.

Figure 4:
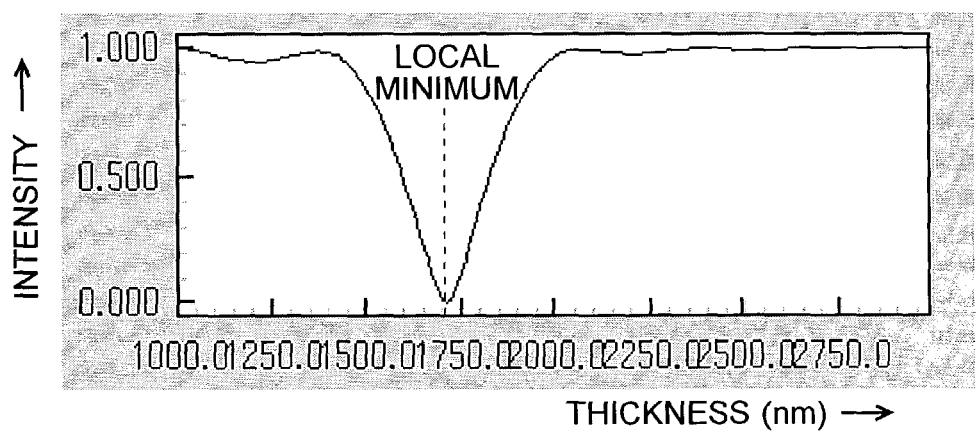
FIG. 4 is a graph of least square error against assumed thickness.
Figure 5:
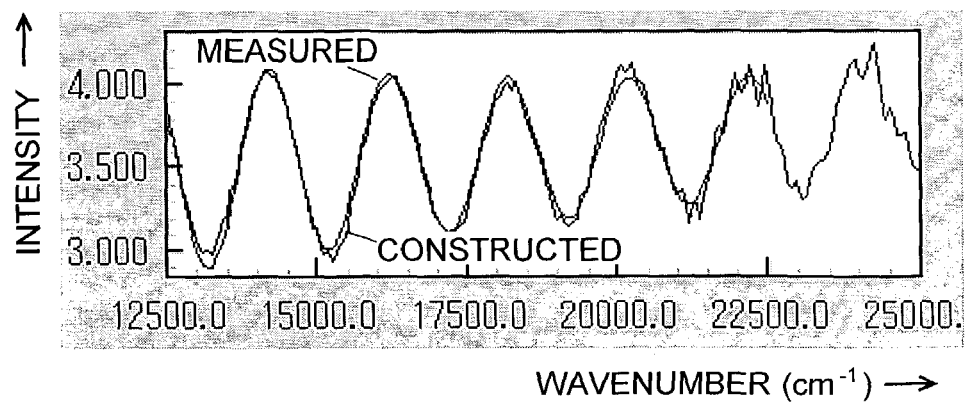
FIG. 5 is a graph of a measurement spectrum overlapped by an optimal constructed spectrum.
Figure 6:
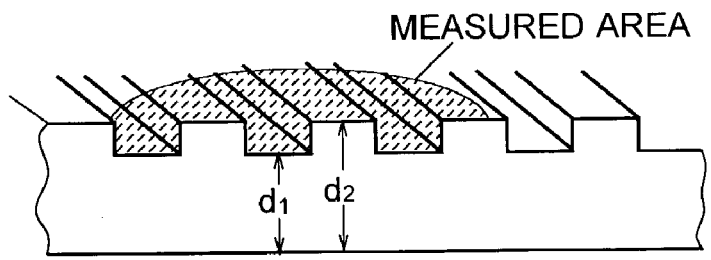
FIG. 6 is a sectional view of a layer having two thicknesses.
Figure 7:
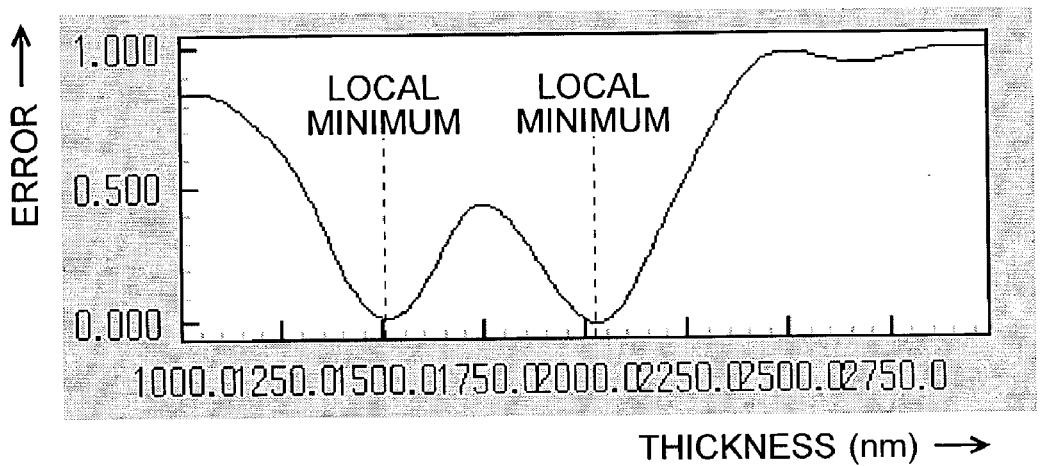
FIG. 7 is a graph of least square error against assumed thickness in the case where the layer has two thicknesses.
Figure 8:
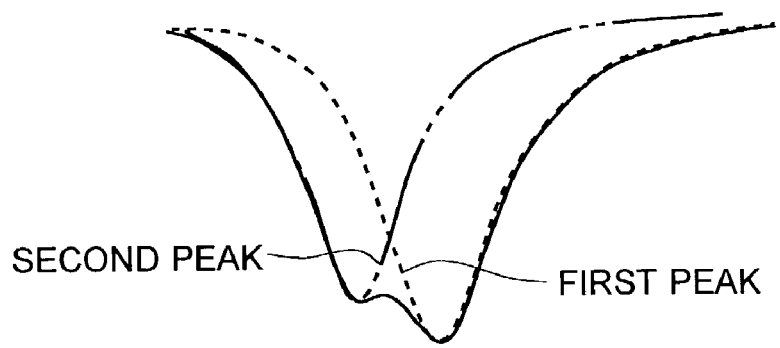
FIG. 8 is an example graph where two local minimums are very close.
Figure 9:
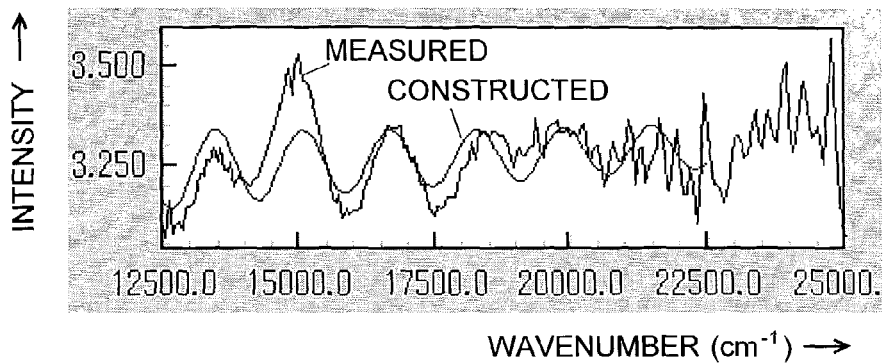
FIG. 9 is a graph of a measured spectrum overlapped by the closest constructed spectrum obtained by the first method when the layer has two thicknesses.
Figure 10:
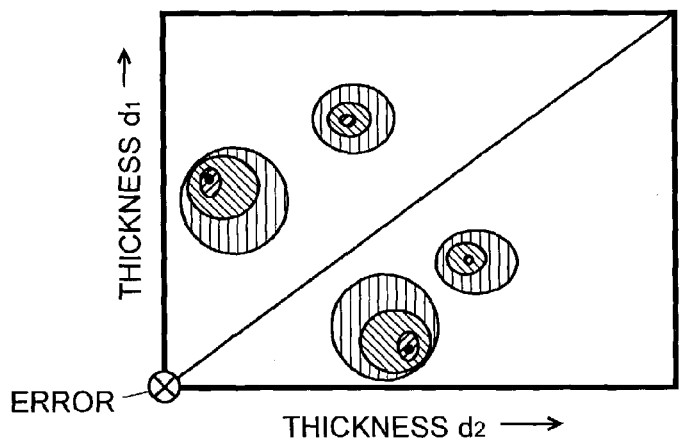
FIG. 10 is a graph showing another expression of the relationship between the thicknesses $d_1$ and $d_2$ and the least square error.
Figure 11:
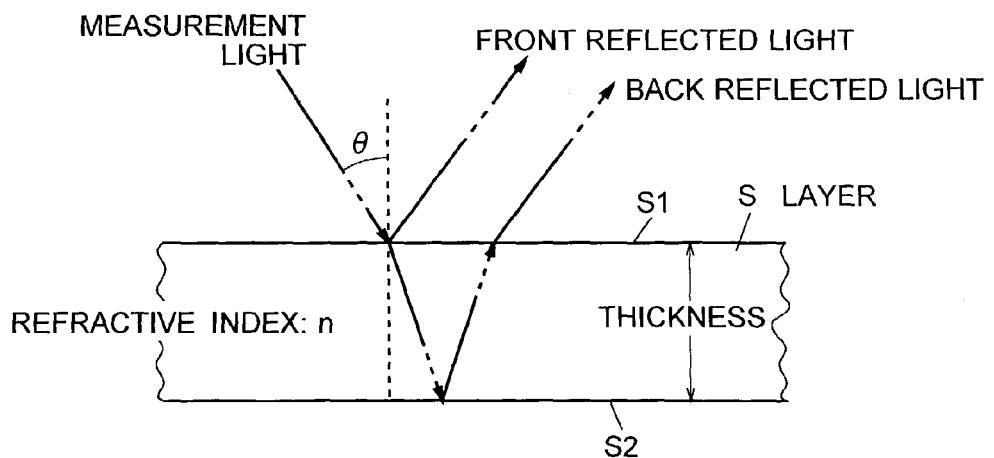
FIG. 11 is an optical diagram explaining an interference of two reflected lights from a thin layer.

When the calculations are started, the value of thickness d is set at $d_a$ (step S2), and the square error between the constructed spectrum f(x) and the measured spectrum g(x) is calculated (step S3). Then the thickness d is checked to be larger than the maximum range border $d_b$ (step S4). When the value d is not larger than $d_b$, the thickness d is set at d+$\Delta d$ and the process returns to step S3. Steps S3, S4 and S5 are repeated until the thickness reaches the maximum range border $d_b$. When the calculations in the range $d_a$–$d_b$ are completed, the curve as shown in FIG. 4 is obtained (step S6). The minimum point of the curve is detected and the thickness corresponding to the minimum point is determined (step S7). Thus the thickness of the layer S is determined with high accuracy.

When the layer S has plural thicknesses, they can be similarly determined.

The embodiment described above is a mere example and it is apparent for a person having ordinary skill in the art to modify the method within the scope of the present invention. For example, the base spectrums for representing the constructed spectrum can be taken differently from the above explanation. When the thickness is very thin, peaks of a definite cycle tend to be less conspicuous in the interference spectrum. In this case, it is better not to use the sin term and the 1/x term in the bases for obtaining closer approximation to the measured spectrum. By appropriately modifying the terms of the functions $f_0(x)$, $f_1(x)$, $f_2(x)$, $f_3(x)$, $f_4(x)$ and $f_5(x)$ in equations (3) and (7), a better approximation may be obtained.

According to the method and apparatus of the present invention, the offset, drift, phase shift and amplitude attenuation, etc. are taken into account, so that the accuracy of the thickness measurement is greatly improved. Conventionally, it was impossible to measure plural thicknesses of a layer at a time, but according to the method of the present invention, they can be measured simultaneously at high accuracy.

What is claimed is:

1. A method of measuring a thickness of a layer comprising steps of:

casting a monochromatic light on the layer;

measuring an intensity of an interference light of the lights reflected by the front surface and back surface;

obtaining a measured spectrum by plotting the intensity of the interference light while the wavenumber of the monochromatic light is changed;

creating a constructed spectrum based on an assumed thickness using a predetermined function;

calculating an error between the measured spectrum and the constructed spectrum; and detecting a value of the assumed thickness at which the error is minimum while changing the assumed thickness, whereby the value is determined as the thickness of the layer, wherein the constructed spectrum is created by a linear sum of a plurality of base spectrums, where the base spectrums are functions of the assumed thickness.

2. The thickness measurement method according to claim 1, wherein the base spectrums are respectively expressed by the following functions:

$f_0(x)=1$, $f_1(x)=x$, $f_2(x)=(1/x)\sin \omega x$, and $f_3(x)=(1/x)\cos \omega x$.

3. The thickness measurement method according to claim 1, wherein:

the layer has a plurality of thicknesses;

a plurality of thicknesses are assumed in the constructed spectrum creating step;

the error calculations are performed for every combination of the plurality of assumed thicknesses; and the thicknesses of the layer are determined by the values at which the error is local minimum.

4. The thickness measurement method according to claim 3, wherein the constructed spectrum is created by a linear sum of a plurality of base spectrums, where the base spectrums are functions of the assumed thicknesses.

5. The thickness measurement method according to claim 4, wherein the base spectrums are respectively expressed by the following functions:

$$f_0(x)=1,$$

$$f_1(x)=x,$$

$$f_2(x)=(1/x)\sin \omega_1 x,$$

$$f_3(x)=(1/x)\cos \omega_1 x,$$

$$f_4(x)=(1/x)\sin \omega_2 x \text{ and}$$

$$f_5(x)=(1/x)\cos \omega_2 x.$$

6. An apparatus for measuring a thickness of a layer, the apparatus comprising:
  means for casting a monochromatic light on the layer;
  a photodetector for measuring an intensity of an interference light of the lights reflected by the front and back surfaces of the layer;
  means for creating a measured spectrum by plotting the intensity of the interference light while changing the wavenumber of the monochromatic light;
  means for creating a constructed spectrum based on an assumed thickness using a predetermined function;
  means for calculating an error between the measured spectrum and the constructed spectrum; and
  means for detecting a value of the assumed thickness at which the error is minimum while changing the assumed thickness, whereby the value is determined as the thickness of the layer,
  wherein the constructed spectrum creating means creates the constructed spectrum by a linear sum of a plurality of base spectrums, where the base spectrums are functions of the assumed thickness.

7. The thickness measuring apparatus according to claim 6, wherein the base spectrums are respectively expressed by the following functions:

$$f_0(x)=1,$$

$$f_1(x)=x,$$

$$f_2(x)=(1/x)\sin \omega x, \text{ and}$$

$$f_3(x)=(1/x)\cos \omega x.$$

8. The thickness measuring apparatus according to claim 6, wherein:
  the constructed spectrum creating means creates the constructed spectrum using a plurality of assumed thicknesses; and
  the error calculating means performs the error calculation for every combination of the plurality of assumed thicknesses; and
  the thicknesses determining means determines the thicknesses of the layer as the combination of the assumed thicknesses at which the error is local minimum.

9. The thickness measuring apparatus according to claim 8, wherein the constructed spectrum is created by a linear sum of a plurality of base spectrums, where the base spectrums are functions of the assumed thicknesses.

10. The thickness measurement method according to claim 9, wherein the base spectrums are respectively expressed by the following functions:

$$f_0(x)=1,$$

$$f_1(x)=x,$$

$$f_2(x)=(1/x)\sin \omega_1 x,$$

$$f_3(x)=(1/x)\cos \omega_1 x,$$

$$f_4(x)=(1/x)\sin \omega_2 x \text{ and}$$

$$f_5(x)=(1/x)\cos \omega_2 x.$$

* * * * *